United States Patent [19]

Eichhorn et al.

[11] Patent Number: 4,596,736

[45] Date of Patent: Jun. 24, 1986

[54] FIBER-REINFORCED RESINOUS SHEET

[75] Inventors: Jacob Eichhorn; Ritchey O. Newman, Jr.; Frederick J. Lowes, Jr., all of Midland, Mich.

[73] Assignee: The Dow Chemical Company, Midland, Mich.

[21] Appl. No.: 616,871

[22] Filed: Jun. 4, 1984

[51] Int. Cl.$^4$ .......................... B32B 3/10; B32B 7/02
[52] U.S. Cl. .................................. 428/215; 428/284; 428/285; 428/286; 428/287; 428/297; 428/298; 428/302; 428/309.9; 428/317.9; 428/327; 428/401; 428/516; 156/62.2
[58] Field of Search ............... 428/284, 215, 286, 285, 428/287, 297, 298, 302, 401, 86, 309.9, 317.9, 327, 516

[56] References Cited

U.S. PATENT DOCUMENTS

| | | | |
|---|---|---|---|
| 4,091,142 | 5/1978 | Elmore et al. | 428/309.9 |
| 4,269,884 | 5/1981 | DellaVecchia et al. | 428/298 X |
| 4,284,683 | 8/1981 | Hipchen et al. | 428/298 X |
| 4,339,490 | 7/1982 | Yoshioka et al. | 428/65 |
| 4,431,696 | 2/1984 | Di Drusco et al. | 428/516 X |

Primary Examiner—P. C. Ives

[57] ABSTRACT

Laminate structures are prepared having a substantially non-reinforced polymer core and outer layers comprising a resin containing randomly oriented reinforcing fibers from about 0.06 to about 2 inches in length. In addition, a process for preparing such laminates is disclosed.

13 Claims, No Drawings

4,596,736

FIBER-REINFORCED RESINOUS SHEET

BACKGROUND OF THE INVENTION

This invention relates to fiber-reinforced resins, more particularly to composite materials containing layers of fiber-reinforced plastics and one or more layers of non-reinforced plastics.

It is known that the incorporation of reinforcing fibers into resinous articles significantly enhances the mechanical properties thereof. Thus, fiber-reinforced plastics are commonly employed in applications requiring high strength and stiffness. Since, however, the inclusion of such fibers adds both to the density and the cost of the composite, it is often desirable to provide a means by which the fiber content can be reduced while retaining good mechanical properties.

In U.S. Pat. No. 4,431,696 it is taught to prepare a "sandwich" structure having fiber-reinforced skins thermowelded to a plastic core. In this patent, it is necessary that the polymers of the skins be compatible with those of the core, since the bonding of the respective layers together is necessarily done by thermowelding. This greatly reduces the types of polymers suitable for use in the disclosed structures. In fact, it is often desirable to use different polymers in the core and outer layers of the composite, to take advantage of particularly beneficial combinations of properties. In addition, the outer glass-reinforced layers of the composite of the '696 patent are prepared from a fibrillar polymer, which greatly reduces the types of polymers available for use in such composites as well as significantly increasing the cost of the composite. The use of such fibrillar polymers renders the manufacture and processing of the outer layers more difficult and costly. It is also difficult to obtain good physical properties using such fibrillar polymers.

Thus, it would be desirable to provide a high strength fiber-reinforced resin having relatively low levels of reinforced fibers, but in which a wide range of resins are useful.

SUMMARY OF THE INVENTION

The present invention is a resin sheet material comprising (a) an intermediate layer comprising a substantially non-fiber-reinforced thermoplastic resin and (b) bound onto each major surface of said intermediate layer, an outer layer of a fiber-reinforced resin. The reinforced outer layer comprises a continuous polymeric matrix prepared from a finely particulate non-fibrillar polymer and optionally, a minor amount of a fibrillar polymer. Distributed throughout said matrix are reinforcing fibers having an average length from about 0.06 to about 2 inches, which fibers are randomly oriented in two dimensions substantially in the plane defined by said outer layer.

DETAILED DESCRIPTION OF THE INVENTION

The sheet material of this invention is particularly suitable for use as a structural or load bearing material. Accordingly, the thickness of this sheet material is advantageously adapted for such use. Typically, a thickness of from about 0.3 to about 50 mm (about 0.01 to about 2 inches) is suitable when the sheet is employed as a structural or load bearing material. More preferably, the sheet comprises outer layers which are each from about 0.1 to 10, preferably about 0.3 to 1.0 mm thick, and an intermediate layer which is from about 0.1 to 30, preferably about 1.0 to 10 mm thick. As described more fully hereinafter, the intermediate layer of this sheet material may comprise a cellular (or foamed) polymer. In such cases, a substantially thicker sheet material, up to 6 inches or more in thickness, may be employed.

The relative thicknesses of the intermediate nonreinforced layer and the outer reinforced layer are chosen such that the sheet material has a desired combination of mechanical properties (i.e., high tensile strength and modulus, high flexural strength and modulus, good impact strength, etc.). Because of the laminate structure of the sheet material of this invention, a combination of high flexural strength and stiffness at moderate total reinforcement level is possible. In addition, the laminate structure provides for flexibility in the manufacturing process, thereby allowing one to "tailor" the properties of the sheet material to the intended use. In particular, it is usually desirable that the sheet material has both excellent tensile and flexural properties.

In general, it is desirable that the outer layer be as thin as possible in order to minimize the amount of reinforced fibers used in the sheet. Conversely, the outer layer must be sufficiently thick that the sheet has the desired physical properties. When the intermediate layer comprises a solid (i.e. not foamed or cellular) resinous material, the aforementioned criteria are generally met when the thickness of each outer layer is from about 3 to 40, preferably about 5 to 35 percent of the total thickness of the sheet. When the intermediate layer comprises a foamed resinous material, the thickness of each outer layer as a percentage of the thickness of the sheet material is generally smaller, typically from about 1 to 25, preferably 1 to 10 percent of the thickness of the sheet.

The sheet of this invention comprises an intermediate layer of a thermoplastic resin which contains little or no reinforcing fibers and, bound to each major surface of said intermediate layer, an outer layer which is reinforced with fibers. The term "layer", as used herein, is intended to only designate a specific portion of the sheet material without any reference to the manner in which the sheet is made and, further, is not intended to indicate the precise structure of the sheet. For example, when the resin sheet of this invention comprises outer and intermediate layers of like polymers, the respective layers may be fused together to form a single continuous resin matrix, the outer portions of which contain reinforcing fibers. In such case, the sheet may not contain distinct layers of polymeric material but a rather indistinct central region containing little or no reinforcing fiber and outer regions in which the reinforcing fibers are contained. Conversely, the sheet of this invention may comprise a laminate of 3 or more distinct polymer layers which are fused or glued together with a suitable adhesive. In the latter case, more distinct layers are present in the sheet material.

Similarly, the term "bound", as used herein, is used to indicate simply that the outer layers are attached to the intermediate layer, without reference to the manner of said attachment. The outer layers may be bound to the intermediate layer by heat bonding, or, alternatively, the respective layers may be adhered to each other, such as with a suitable adhesive. The term "bound" is employed herein to designate all such means by which the respective layers are attached.

The intermediate layer comprises a thermoplastic resin containing little or no reinforcing fibers. By "little or no reinforcing fibers" it is meant that the content of reinforcing fibers in the intermediate layer is less than about 25 percent of the fiber content of the outer layers. Preferably the reinforcing fiber contained in the intermediate layer is less than about 15 percent of the fiber content of the outer layers. More preferably, the intermediate layer contains essentially no reinforcing fiber.

Said intermediate layer may comprise any of a wide variety of resins, provided that such resin is normally solid at room temperature. Suitable such resins include diverse polyolefins, such as high density polyethylene, low density polyethylene, linear low density polyethylene, ultra high molecular weight polyethylene, polypropylene, chlorinated polyethylene, and the like; polycarbonates; copolymers of ethylene and acrylic acid; diverse polyamides, particularly the diverse nylons such as nylon 6 and nylon 6,6; poly(phenylene oxide) resins; poly(phenylene sulfide) resins; polyoxymethylenes; polyesters; rubber modified resins such as acrylonitrile, butadiene, styrene (ABS) resins; polyoxyalkylenes; copolymers of a major portion of a vinylidene chloride and a minor portion of at least one other copolymerizable monomer; polymers of vinyl aromatics, particularly styrene, vinyltoluene, t-butyl styrene, vinyl naphthalene, and the like; and ethylcellulose and other thermoplastic cellulose derivatives.

Foamed polymers such as foamed polystyrene, polyurethane foams, polyisocyanate and crosslinked polyethylene foams are also useful as the intermediate layer.

The intermediate layer may comprise a single layer of a suitable resin or may itself be structured (i.e., contain a plurality of individual layers, such as a coextruded sheet as is taught in U.S. Pat. No. 3,557,265). When the intermediate layer comprises a plurality of individual layers, such individual layers may be all of the same resin or each of the individual layers may be of varying polymers.

It is generally preferred that the diverse layers which comprise the sheet of this invention be arranged symmetrically about the plane bisecting the sheet and parallel to the major surfaces thereof. When such layers are symmetrically arranged, the sheet is more easily processed, shaped and handled in the softened state. When such layers are asymmetrically arranged, the sheet material often tends to warp or otherwise become distorted upon heating as in a shaping or molding process. Such undesirable tendencies are generally minimized when the respective layers and the individual layers which may comprise said layers are chosen such that the sheet of this invention is substantially symmetrically arranged about said central plane.

If the layers are arranged asymmetrically about said central plane, it is advantageous to employ individual layers having like coefficients of thermal expansion, as is disclosed in U.S. Pat. No. 4,291,084 to Segal. The coefficient of thermal expansion for any layer may be "matched" to that of another layer by the incorporation of certain fillers, such as mica, into one of the layers.

Bound to each major surface of said intermediate layer is a layer of a fiber reinforced resin. This outer layer contains reinforcing fibers which are advantageously from about 0.06 to about 2 inches (1.5 to 50 mm) in length and are preferably from about 0.125 to about 1, (3 to 25 mm). In addition, such fibers advantageously have an aspect ratio which is not less than about 40, preferably not less than about 100. The fibers are advantageously homogeneously dispersed throughout the resin matrix so that all areas of the outer layer contain essentially the same proportion of glass.

The fibers are randomly oriented in two dimensions in the plane defined by the sheet material. By "randomly oriented in two dimensions in the plane defined by the sheet material" it is meant that (a) the predominant portion of the preferred fibers lie approximately parallel to the major surfaces of the sheet and (b) within said plane, the fibers are randomly oriented (i.e., the fibers are aligned randomly in all directions within said plane).

The fibers usefully employed herein include fibers such as glass, carbon, ceramic, boron and the like; metallic fibers; fibers of organic polymers having a high melting point such as aromatic polyamides, including the so-called aramid fibers, polyesters, polybenzimide, polybenzoxazol, polybenzothiazol and the like; cellulosic fibers and other fibers known to be useful as reinforcing agents for resinous materials. Of the foregoing, glass fibers are of particular interest due to their relatively low cost, high availability and the excellent physical properties they impart to resins in which they are contained. Mixtures of the foregoing fibers are, of course, suitable herein.

Preferably, the fibers have a diameter from about 0.00002 to about 0.001 inch (0.5 to 25 microns) (i.e., those having diameters commonly designated as "B"-"U" inclusive). Preferably, the fibers have a diameter from about 0.00025 to 0.00075 inches (i.e., diameters designated as "DE"-"P" inclusive).

The outer layers contain a sufficient amount of the fibers to impart strength and rigidity to the sheet of this invention. Typically said outer region or layer contains from about 10 to 60, preferably 15 to 50 percent by weight of reinforcing fibers. In addition, the sheet as a whole typically has a fiber content from about 1 to 30, preferably 5 to 20, more preferably about 2 to 15 percent by weight.

The fibers employed in this invention may, if desired, be "sized", i.e., treated or coated to render them more compatible with thermoplastic resin. Said sizing is generally a starch/oil emulsion or a mixture of an organic resin film former, a wetting agent and surfactant wherein the surfactant is commonly a methacrylatochromic chloride complex or any of a variety of silicone coupling agents which are well known in the art.

The outer layer further comprises a continuous polymeric matrix. In general, the resins described hereinbefore as useful in the intermediate layer are useful in said outer layer. In addition, thermosetting resins such as epoxy resins, polyurethanes, phenolformaldehyde resins and the like are also useful in the outer layer.

The resin used in the outer layer may be the same or different than that employed in the intermediate layer. When said outer and intermediate layers are to be heat bonded, one can use compatible resins in the respective layers, but the use of such compatible polymers is not necessary. A surprising aspect of this invention is that very good bonding is readily achieved even when non-compatible polymers are employed.

The continuous polymer matrix of the outer layer is prepared from a finely particulate non-fibrillar polymer and, optionally, a minor amount of a fibrillar polymer. By "non-fibrillar" it is meant that the polymer particles have a small aspect (length/diameter) ratio. Preferably the length/diameter ratio of the non-fibrillar polymer particles is less than about 5, preferably less than about 3. Said non-fibrillar polymer comprises the major portion, i.e., about 70 percent by weight or more, of the continuous matrix of the outer layer. In addition a minor portion, i.e., up to about 10 percent, preferably less than about 5 percent by weight of the continuous matrix may be prepared from a fibrillar polymer, such as polyolefin fibers. However, the use of such fibrillar polymers (i.e., those having an aspect ratio greater than about 10) is optional herein. Note, however, that polymeric reinforcing fibers, which do not melt to form part of the polymeric matrix, may be used herein as described hereinbefore. The finely particulate polymer advantageously has a particle size from about 0.1–500 microns in diameter.

In a preferred embodiment, the continuous matrix contains the solids of a polymeric binder, such as a charged polymeric latex or an ionic starch. The preparation of fiber-reinforced resins using such binders is described in U.S. Pat. No. 4,426,470 and European Patent Publication No. 31,832.

In addition, any of the layers may also optionally contain minor amounts of filler such as silicon dioxide, calcium carbonate, magnesium oxide, magnesium hydroxide, calcium silicate and mica. Pigments or dyes may also be used to impart opacity and/or color. Various chemical additives such as anti-oxidants, UV stabilizers, thickeners, foaming agents, anti-foaming agents, bacteriocides and crosslinking agents such as dicumyl peroxide and azobisformamide.

When the resin sheet material of the invention is employed in a compression molding or similar forming process, it is often advantageous, in order to preserve the layered structure in the molding process, to use resins in the respective layers such that the melt viscosities of the respective layers are approximately equivalent. Because the reinforcing fibers contribute to the melt viscosity of the outer layers, it is generally desirable, when a moldable resin sheet is desired, to employ a resin in the outer layer which, if not reinforced, has a lower melt viscosity than that of the intermediate layer. Such lower melt viscosity polymer may be a different polymer than the polymer of the intermediate layer, or may be a like polymer, but of lower molecular weight. Similarly, fillers may be employed in the intermediate layer to increase the melt viscosity.

Said outer layer may be densified, i.e., has a void volume which is less than about 20 percent, preferably less than about 15 percent of the volume of said outer layer.

The outer layer is normally prepared separately from the intermediate layer and thereafter bound thereto by any suitable means. Various methods of preparing the outer layers are suitable herein.

The most preferred method of preparing said outer layers is by a process as described in U.S. Pat. No. 4,426,470 to Wessling et al. or European Patent Publication 31,832, both of which are incorporated herein in their entirety. In such process, a dilute slurry of a finely divided non-fibrillar resin, short reinforcing fibers and a binder (which is typically a latex) is formed. Optionally, the slurry contains a minor amount of a fibrillar resin. A flocculant is then added to the slurry causing the dispersed resin, fiber and binder to coagulate. The coagulated slurry is dewatered and dried, forming a mat in which the fibers are randomly oriented and substantially unbroken. This mat is normally then densified by heating it to the softening point of the resin and simultaneously compressing it to reduce its thickness. The resulting sheet contains a continuous polymeric matrix which, in addition to the resin, contains the solids of the binder and flocculant.

This aqueous method of preparing the outer layers provides several advantages over alternative methods. First, the fibers remain substantially unbroken during the preparation and subsequent densification of the mat. This is of great significance since breakage of fibers causes substantial reduction in performance of the fiber reinforced layer. In addition, the fibers in the mat lay primarily in the plane defined by the mat (i.e., roughly parallel to the major surface of the mat) which is the direction where the fibers make the greatest contribution to the overall properties of the reinforced layer. Additionally, this aqueous method permits one to prepare a mat in which the fibers are randomly oriented within the plane defined by the mat. Accordingly, the layer so prepared has substantially equal tensile and flexural properties in all directions.

Other suitable but less preferred methods are also available for preparing the reinforced region or layer. In general, any method by which the fibers may be distributed within a polymeric matrix as described herein may be used. One such less preferred method involves the formation of a mat of short reinforcing fibers which mat is sandwiched between two layers of a resin. The resin layers are then softened and the sandwich compressed so that the fibers become impressed into the softened resin. Such less preferred method tends to cause substantial breakage of the fibers and the resulting outer layer does not adhere as well to the intermediate layer as do outer layers made by more preferred processes.

The reinforced outer layers are subsequently bonded to the intermediate layer. In general, any process by which the respective layers can be securely attached to each other is suitable herein. The particular method of choice may vary somewhat according to the particular polymers employed in the respective layers. When the polymers in the respective layers are the same or similar, it is often possible to obtain adequate bonding by heating each layer above its softening temperature and then affixing the softened layers together under pressure so that the polymers in the respective layers melt and then solidify together. When the polymers in the adjacent layers are normally adherent to each other, simple joining of the layers together under conditions of heat and/or pressure may be sufficient to bond them together. Alternatively, a distinct adhesive layer is interposed between the adjacent layers to provide the requsite bonding. Suitable adhesives depend somewhat on the particular polymers employed in the respective layers but include, for example, ethylene/acrylic acid copolymers, ethylene/vinyl acetate copolymers, styrene/butadiene block copolymers, phenoxy resins and other conventional adhesives.

In a preferred process, prior to bonding to the intermediate layer, the surface of each outer layer which will be bonded to the intermediate layer is heated above its softening point. In this manner, the reinforcing fibers are caused to protrude slightly from the surface of said outer layer. Preferably, the heating is controlled such that only the surface of the outer layer is heated above its softening point, so that only those fibers near said surface are caused to prutrude therefrom. Overheating causes the entire sheet to expand, forming a low density porous composite. While such a low density porous composite can be used in this invention if it is subsequently redensified, it is preferred to localize the heating at the surface of the densified sheet so that the expansion thereof is controlled.

Despite the lack of substantial amounts of reinforcing fibers in the intermediate layer of the resin sheet of this invention, the resin sheet has surprisingly good flexural properties. It is believed that by concentrating the reinforcing fibers in the outer layers of the resin sheet, the fibers more effectively reinforce the sheet than when a like amount of the fibers are distributed throughout the sheet. Thus, the resin sheet of this invention permits the use of lower overall levels of reinforcing fibers to obtain flexural properties comparable to those of conventional reinforced plastics having higher fiber levels. Conversely, at an equivalent level of fiber content, substantially greater flexural properties are obtained. In particular, the flexural heat distortion temperature of the resin sheet of this invention is far higher than expected.

Further improvements in certain properties, notably the heat distortion temperature, are achieved by subjecting the laminate to radiation, such as B radiation, to crosslink the polymers of the outer layers. If desired, the outer layers may be radiated prior to attaching them to the intermediate layer. Typically, treatment with from about 0.5-15, preferably about 1-10, more preferably about 2-6 megarads of radiation such as electron beam or cobalt-60 radiation results in significant increases in the flexural heat distortion temperature. Often, increases of up to 20° C. or more are seen. This is particularly surprising because non-reinforced resins do not exhibit significant increases in flexural heat distortion temperature with radiation curing. Also surprising is that the radiation treatment does not significantly degrade the polymers in the composite, and that little or no decrease in other mechanical properties is seen. To increase the efficiency of the radiation, sensitizers such as trivinyl isocyanurate, trimethylol propane triacrylate and the like may be used in preparing the resin sheet material.

The resin sheet of this invention is useful in sheet form as a structural panel and is further useful in preparing high strength molded articles.

The following examples are provided to illustrate the invention but not to limit the scope thereof. All parts and percentages are by weight unless otherwise indicated.

EXAMPLE 1

Using the general method described in Example 1 of U.S. Pat. No. 4,426,470, a high density polyethylene (HDPE) mat containing 35.8 percent randomly oriented substantially unbroken chopped glass fibers having an average length of about 3/16 inches and a diameter of about 15μ is prepared. This mat is hereafter referred to as "Mat A".

Similarly, a second HDPE mat containing 41.1 percent glass is prepared and is referred to as "Mat B" herein.

A 13 by 13 inch section of Mat A is used for each of the outer layers in the preparation of resin sheet Sample No. 1A. The intermediate layer is high density polyethylene (HDPE) having a 0.964 specific gravity and a 1.0 melt index. Sample No. 1A is prepared by stacking the mat, HDPE and mat layers in a 13 by 13 inch mold, heating the mold under minimum pressure for 5 minutes at 140°-155° C., and then raising the pressure with continued heating to 80-100 tons (1000 to 2000 psi). The resin sheet is then cooled in the mold under pressure. The resulting resin sheet is about 0.125 inch thick with the outer layers each being about 10 mils thick.

Sample No. 1B is prepared in like manner, except that Mat B is used instead of Mat A.

Sample No. 1C is prepared in like manner as Sample No. 1A, except two sheets of Mat A are employed in each outer layer of the resin sheet. The total thickness of Sample No. 1C is approximately 0.125 inch, where the addition of the additional outer layer being compensated for by a corresponding decrease in the thickness of the core.

Sample No. 1D is prepared in like manner as Sample No. 1C, except two layers of Mat B are used to prepare each outer layer.

Several comparative samples are also prepared. Comparative Sample No. C-1 is a 100 percent HDPE sheet having a thickness of about 0.125 inch prepared by compressing HDPE powder in a 13×13 inch mold. In the molding process, the HDPE is charged to the cold mold. The mold is heated to 140° to 155° C. under minimum pressure and then raised to 80 to 100 tons. The sheet is cooled in the mold under pressure.

Comparative Sample No. C-2 is prepared in the same manner as Comparative Sample No. C-1, except a HDPE molding compound containing 30 percent glass is employed instead of the HDPE.

Comparative Sample No. C-3 comprises a 0.125 inch thick sheet prepared from several layers of a HDPE mat containing 40.25 percent substantially unbroken, randomly oriented glass fibers having an average length of about 3/16 inch. This mat is prepared according to the general procedure described in Example No. 1 of U.S. Pat. No. 4,426,470 and subsequently densified.

Comparative Sample No. C-4 is a laminated sheet having faces of a HDPE molding compound containing 30 percent glass used in Comparative Sample No. C-2 and a HDPE core. Total thickness is 0.125 inches with outer layers about 12 mils thick.

The ultimate tensile stress and Young's modulus of each of Sample Nos. 1A through 1D and Comparative Sample Nos. C-1 to C-4 were determined per ASTM D-638 using a Type I test bar and a strain rate of 0.2 inch per minute. Flexural strength and flexural modulus are evaluated per ASTM D-790. Notched Izod properties (impact strength) are measured per ASTM D-256 with a notch tip radius of 0.01 inch. Heat distortion is measured per ASTM D-648 with an outer fiber stress of 264 psi. The results of these various tests are as reported in Table I following.

TABLE I

| Sample No. | Percent[1] Glass | Ultimate[2] Tensile Stress $10^3$ (psi) | Young's[2] Modulus $10^5$ (psi) | Maximum[3] Flexural Stress (psi) | Flexural[3] Modulus $10^5$ (psi) | Impact[4] Strength | Heat[5] Distortion Temp. °C. |
|---|---|---|---|---|---|---|---|
| 1A | 6.1 | 2.57 | 2.2 | 7,398 | 2.9 | 2.22 | 90 |
| 1B | 6.3 | 2.93 | 2.2 | 8,035 | 3.0 | 2.34 | 94 |
| 1C | 12.0 | 5.00 | 3.5 | 10,941 | 4.7 | 3.26 | 121 |
| 1D | 13.0 | 5.05 | 3.6 | 10,598 | 4.6 | 3.40 | 133 |

TABLE I-continued

| Sample No. | Percent[1] Glass | Ultimate[2] Tensile Stress 10³ (psi) | Young's[2] Modulus 10⁵ (psi) | Maximum[3] Flexural Stress (psi) | Flexural[3] Modulus 10⁵ (psi) | Impact[4] Strength | Heat[5] Distortion Temp. °C |
|---|---|---|---|---|---|---|---|
| C-1* | 0 | 2.74 | 1.6 | 3,958 | 1.5 | 1.95 | 54 |
| C-2* | 29.7 | 4.05 | 4.7 | 8,191 | 3.0 | 1.44 | 77 |
| C-3* | 40.3 | 11.4 | 8.8 | 16,752 | 7.1 | 5.54 | 130 |
| C-4* | 7.0 | 1.13 | 2.1 | 5,839 | 2.7 | 1.52 | N.D. |

*Not an example of this invention.
N.D. - Not Determined.
[1] Determined by burning out random sections of the sample to measure glass content.
[2] ASTM D-638
[3] ASTM D-790
[4] ASTM D-256
[5] ASTM D-648

As seen in Table I above, the resin sheet of this invention exhibits excellent physical properties, especially when compared to other glass reinforced composites having comparable glass contents. All samples of this invention exhibit greatly improved properties as compared to Comparative Sample No. C-1, the non-reinforced HDPE. Interestingly, the properties of Sample Nos. 1A to 1D are also comparable or superior to those of Comparative Sample No. C-2, despite having a much lower glass content. Comparative Sample No. C-4 shows that laminate structures using, as outer layers, a glass filled HDPE molding compound do not provide any significant advantages over the unfilled HDPE of Comparative Sample No. C-1.

Comparative Sample C-3 shows the physical properties of a sheet containing randomly oriented glass fibers. While the properties of Comparative Sample No. C-3 are generally superior to those of Sample Nos. 1A through 1D, it is seen that the difference in said properties is not particularly great, especially considering that Sample No. C-3 contains 40 percent glass. In particular, the heat distortion temperatures of Sample Nos. 1C and 1D compare quite well with that of Comparative Sample No. C-3, even though Sample Nos. 1C and 1D only contain approximately one-third the amount of reinforcing fibers.

EXAMPLE 2

Three resin sheets of this invention are prepared having outer layers prepared from one layer of Mat B and a low density polyethylene intermediate layer. The low density polyethylene (LDPE) has a 0.919 specific gravity and a 7.0 melt index. The general procedure described in Example 1 is used to prepare the sample. The first resin sheet, Sample No. 2A is tested for ultimate tensile strength, Young's modulus, flexural stress, flexural modulus, notched impact strength and heat distortion temperature as described in Example 1. The second sheet, Example No. 2B is subjected to two megarads radiation and subsequently tested in like manner. The third sheet, Sample No. 2C is subjected to six megarads radiation and also subjected to like testing. The results of such testing are reported in Table II following.

In like manner, Sample Nos. 2D-2F are prepared with outer layers prepared from a single sheet of Mat B and a HDPE intermediate layer.

The HDPE used has a melt index of 1.0 and a density of 0.964. Sample No. 2D is tested as are Sample Nos. 2A-2C. Sample Nos. 2E and 2F are tested after treatment with 2 megarads and 6 megarads, respectively of radiation. The results are as reported in Table II.

For illustration, three duplicate HDPE sheets are prepared. One, is tested with radiation treatment, is designated Comparative Sample No. C-2A. The other two, Comparative Sample Nos. C-2B and C-2C, are treated with 2 and 6 megarads of radiation, respectively, and tested. These results are also reported in Table II.

TABLE II

| Sample No. | Percent[1] Glass | Electron Beam Radiation[6] | Ultimate[2] Tensile Stress 10³ (psi) | Young's[2] Modulus 10⁵ (psi) | Maximum Flexural[3] Stress (psi) | Flexural[3] Modulus 10⁵ (psi) | Impact[4] Strength | Heat[5] Distortion Temperature °C |
|---|---|---|---|---|---|---|---|---|
| 2A | ~6 | 0 | 1.56 | 1.4 | 4679 | 2.1 | 6.13 | 79 |
| 2B | ~6 | 2 | 1.53 | 1.5 | 4293 | 1.7 | 6.55 | 94 |
| 2C | ~6 | 6 | 2.49 | 1.6 | 5855 | 2.0 | 6.760 | 94 |
| 2D | 6.3 | 0 | 2.93 | 2.2 | 8035 | 3.0 | 2.34 | 94 |
| 2E | 6.3 | 2 | 2.64 | 2.3 | 9888 | 5.0 | 2.11 | 103 |
| 2F | 6.3 | 6 | 2.27 | 2.4 | 8747 | 3.2 | 2.02 | 114 |
| C-2A* | 0 | 0 | 2.74 | 1.6 | 3958 | 1.5 | 1.95 | 54 |
| C-2B* | 0 | 2 | 2.49 | 1.7 | 4207 | 1.5 | 2.13 | 57 |
| C-2C* | 0 | 6 | 2.56 | 1.6 | 4275 | 1.5 | 3.77 | 59 |

*Not an example of this invention.
[1] Determined by burning out random sections of the sample to measure glass content.
[2-5] Same as [2-5] in Table I.
[6] Amount of radiation applied to sample in megarads It is readily seen that the flexural heat distortion temperature of the resin sheet of this invention is greatly increased with radiation treatment. More significantly, this improvement is gained without any significant adverse effect on the other physical properties of the resin sheet. In contrast, radiation treatment only marginally improves the flexural heat distortion temperature of the non-reinforced resin.

EXAMPLE 3

Using the general procedure described in Example 1, Sample No. 3A is prepared having outer layers prepared from one layer of Mat B (having a HDPE matrix) and an intermediate layer of a polypropylene copolymer sold commercially as Hercules 7823, having a specific gravity of 0.897 and a melt flow of 0.4.

Sample No. 3B is prepared having outer layers each comprising two layers of Mat B and a polypropylene (Hercules 7823) core.

Comparative Sample No. C-6 is a sheet of polypropylene copolymer (Hercules 7823) having a thickness of approximately 0.125 inch.

Comparative Sample No. C-7 contains outer layers of polypropylene sheet (Hercules 7823) and an intermediate layer prepared from two layers of Mat B. Sample No. C-8 is a densified sheet prepared from several layers of a mat prepared according to Example 1, wherein the mat is a 12 melt flow polypropylene (Hercules 6323) having a density of 0.903. The mat contains 40.8 percent glass fibers having an average length of about 3/16 inch and a diameter of about 15μ.

Each of Sample Nos. 3A to 3B and Comparative Sample Nos. C-6 to C-8 are tested as described in Example No. 1 with the results as reported in Table III following.

It is seen that resin sheets of this invention exhibit excellent properties even when the resins in the outer layers are not compatible with the resins of the intermediate layer.

modulus in both the direction of the papermaking machine in which the mats are made and in the cross machine direction. The results are as obtained in Table V following. The density, thickness, and glass content of these samples are given in Table IV following.

TABLE IV

| Sample No. | Thickness mils | Mats Per Side | PP Core Mils | Density g/cc | Glass Wt. % |
|---|---|---|---|---|---|
| 4-1 | 156 | 4 | 50 | 0.95 | 28.5 |
| 4-2 | 146 | 5 | 50 | 1.01 | 30.2 |
| 4-3 | 136 | 2 | 100 | 0.98 | 14.7 |

TABLE V

| Sample No. | Ultimate Tensile Stress (psi) | Young's Modulus $10^5$ (psi) | Maximum Flexural Stress, (psi) | Flexural Modulus $10^5$ (psi) |
|---|---|---|---|---|
| 4-1 | | | | |
| MD | 5,000 | 4.4 | 5,700 | 3.8 |
| CD | 4,700 | 3.4 | 4,300 | 3.4 |
| 4-2 | | | | |
| MD | 7,300 | 6.1 | 11,900 | 5.7 |
| CD | 7,100 | 5.2 | 10,700 | 3.7 |
| 4-3 | | | | |
| MD | 4,100 | 4.3 | 9,700 | 4.3 |
| CD | 4,900 | 3.3 | 9,600 | 3.7 |

MD = Machine direction
CD = Cross-direction

TABLE III

| Sample No. | Percent[1] Glass | Ultimate[2] Tensile Stress $10^3$ (psi) | Young's[2] Modulus $10^5$ (psi) | Maximum Flexural[3] Stress (psi) | Flexural[3] Modulus $10^5$ (psi) | Impact[4] Strength | Heat Distortion Temperature °C. |
|---|---|---|---|---|---|---|---|
| 3A | 6.7 | 2.78 | 2.0 | 6,751 | 2.4 | 4.65 | 75 |
| 3B | 13.3 | 5.37 | 3.4 | 9,933 | 3.5 | 4.41 | 122 |
| C-6* | 0 | 2.88 | 1.5 | 4,960 | 1.6 | 9.60 | 61 |
| C-7* | 6.3 | 3.58 | 2.3 | 5,043 | 1.5 | 6.16 | 75 |
| C-8* | 40.8 | 7.7 | 6.3 | 8,310 | 4.6 | 5.71 | 136 |

*Not an example of this invention.
[1]Determined by burning out random sections of the sample to measure glass content.
[2]ASTM D-638
[3]ASTM D-790
[4]ASTM D-256
[5]ASTM D-648

EXAMPLE 4

Using the general method described in Example 1 of U.S. Pat. No. 4,426,470, a mat is prepared containing 37.8 weight percent of substantially unbroken chopped glass fibers having an average length of about 3/16 inch and a diameter of 13 microns, 7 percent polyvinyl alcohol resin, and 55.2 percent of Hercules Profax ® 6323 polypropylene homopolymer resin having a melt flow of 12 and a density of 0.903. The polyvinyl alcohol is added as a fiber to improve the wet strength of the mat. The dried mat has a sheet weight of 200 pounds per 3000 square feet.

Mats 16 inches wide and 40 inches in length are used as outer layers to prepare laminates having an intermediate layer consisting of sheet extruded from Hercules 6823 polypropylene resin having a melt flow of 0.4, a density of 0.902, and a flexural modulus of 240,000 psi. The sheet materials are prepared using a continuous double belt laminator of the type described in U.S. Pat. No. 3,148,269. The heating zone is controlled at 450° F. and the belt speed at 8¾ inches per minute.

Sample No. 4-1 is prepared using 4 layers of mat to form each outer layer. Sample Nos. 4-2 and 4-3 have 5 and 2 mats, respectively, in each outer layer. Sample Nos. 4-1 to 4-3 are tested for ultimate tensile stress, Young's modulus, maximum flexural stress and flexural The necessary equivalence of the machine direction and cross-direction tensile and flexural properties indicates that the reinforcing fibers are substantially randomly distributed throughout the outer layers of the samples.

What is claimed is:

1. A resin sheet comprising:
(a) an intermediate layer comprising a substantially non-reinforced thermoplastic resin and
(b) bound onto each major surface of said intermediate layer, an outer layer of an aqueous wet-laid fiber-reinforced resin sheet comprising a continuous polymeric matrix prepared from a finely particulate non-fibrillar polymer, and distributed throughout said matrix, reinforcing fibers having an average length from about 0.06 to about 2 inches, which fibers are randomly oriented in two dimensions substantially in the plane defined by said outer layer.

2. The resin sheet of claim 1 wherein each of said outer layer is from about 0.1 to 1 mm thick and the intermediate layer is from about 1 to 10 mm thick.

3. The resin sheet of claim 1 wherein each outer layer is heat bonded to said intermediate layer.

4. The resin sheet of claim 1 wherein each outer layer is bound to said intermediate layer by means of an adhesive layer.

5. The resin sheet of claim 1 wherein the reinforcing fibers comprise glass.

6. The resin sheet of claim 5 wherein said continuous matrix of each said outer layer comprises a polyolefin.

7. The resin sheet of claim 5 wherein said continuous matrix of each said outer layer comprises a poly(vinyl aromatic) resin.

8. The resin sheet of claim 1 wherein said continuous matrix further comprises the solids of a binder and an organic flocculant.

9. The resin sheet of claim 8 wherein said binder is a polymeric latex containing bound ionic charges.

10. The resin sheet of claim 1 wherein said intermediate layer has a cellular structure.

11. The resin sheet of claim 10 wherein said intermediate layer comprises a polystyrene, polyurethane, polyisocyanurate, polyethylene foam, or crosslinked polyethylene foam.

12. The resin sheet of claim 1 wherein each said outer layer contains from about 10 to 60 percent by weight reinforcing fibers.

13. The resin sheet of claim 1 wherein at least the outer layers are radiation crosslinked.

* * * * *

UNITED STATES PATENT AND TRADEMARK OFFICE
CERTIFICATE OF CORRECTION

PATENT NO. : 4,596,736

DATED : June 24, 1986

INVENTOR(S) : Jacob Eichhorn; Ritchey O. Newman, Jr.; Frederick J. Lowes, Jr.

It is certified that error appears in the above-identified patent and that said Letters Patent is hereby corrected as shown below:

Column 6, line 51, "requsite" should read -- requisite --.

Column 11, under Table III's column 8, the word "Heat" should read --Heat$^5$--.

Column 14, after Claim 13, should read Claim 14, -- 14. The resin sheet of Claim 1 where said outer layer additionally comprises a fibrillar polymer from about zero to about 10 percent by weight of said continuous polymeric matrix. --

Signed and Sealed this

Fifteenth Day of September, 1987

Attest:

DONALD J. QUIGG

*Attesting Officer*  *Commissioner of Patents and Trademarks*